United States Patent [19]

Scott, Jr.

[11] Patent Number: 4,867,523

[45] Date of Patent: Sep. 19, 1989

[54] OPTICAL FIBER CONNECTOR INCLUDING SERPENTINE GROOVED MEMBER ACTUATED BY LONGITUDINAL FORCES

[75] Inventor: Charles W. Scott, Jr., Cedar Knolls, N.J.

[73] Assignee: American Telephone and Telegraph Company, AT&T Bell Laboratories, Murray Hill, N.J.

[21] Appl. No.: 263,745

[22] Filed: Oct. 28, 1988

[51] Int. Cl.[4] .............................................. G02B 6/36
[52] U.S. Cl. ................................ 350/96.20; 350/96.21
[58] Field of Search .............. 350/96.10, 96.20, 96.21, 350/96.22, 96.23

[56] References Cited

U.S. PATENT DOCUMENTS

| | | | |
|---|---|---|---|
| 3,803,409 | 4/1974 | Prochazka | 350/96.21 X |
| 4,225,214 | 9/1980 | Hodge et al. | 350/96.21 |
| 4,327,964 | 5/1982 | Haesly et al. | 350/96.20 |
| 4,354,731 | 10/1982 | Mouissie | 350/96.21 |
| 4,395,089 | 7/1983 | McKee | 350/96.20 |
| 4,429,938 | 2/1984 | Flor | 403/349 X |
| 4,553,814 | 11/1985 | Bahl et al. | 350/96.21 |
| 4,611,887 | 9/1986 | Glover et al. | 350/96.21 |
| 4,616,900 | 10/1986 | Cairns | 350/96.20 |
| 4,690,495 | 9/1987 | Giannini | 350/96.21 |
| 4,738,508 | 4/1988 | Palmquist | 350/96.20 X |
| 4,747,658 | 5/1988 | Borsuk et al. | 350/96.20 |
| 4,812,009 | 3/1989 | Carlisle et al. | 350/96.21 |

FOREIGN PATENT DOCUMENTS

| | | | |
|---|---|---|---|
| 0156075 | 10/1985 | European Pat. Off. | 350/96.21 X |
| 0205984 | 12/1986 | European Pat. Off. | 350/96.21 X |
| 2291510 | 6/1976 | France | 350/96.21 |
| 59-111119 | 6/1984 | Japan | 350/96.20 X |
| 61-52608 | 3/1986 | Japan | 350/96.21 X |
| 61-262709 | 11/1986 | Japan | 350/96.15 X |

Primary Examiner—William L. Sikes
Assistant Examiner—Brian M. Healy
Attorney, Agent, or Firm—Lester H. Birnbaum

[57] ABSTRACT

Disclosed is an optical fiber connector useful for high density arrays. A rotating mechanism is employed around the fiber ferrule in combination with a spring so as to engage one or more tabs on the connector sleeve. The rotating mechanism includes a serpentine type groove configuration which captures the tabs when the ferrule is pushed into the sleeve and releases the tabs when a longitudinal force is again applied to the ferrule.

10 Claims, 3 Drawing Sheets

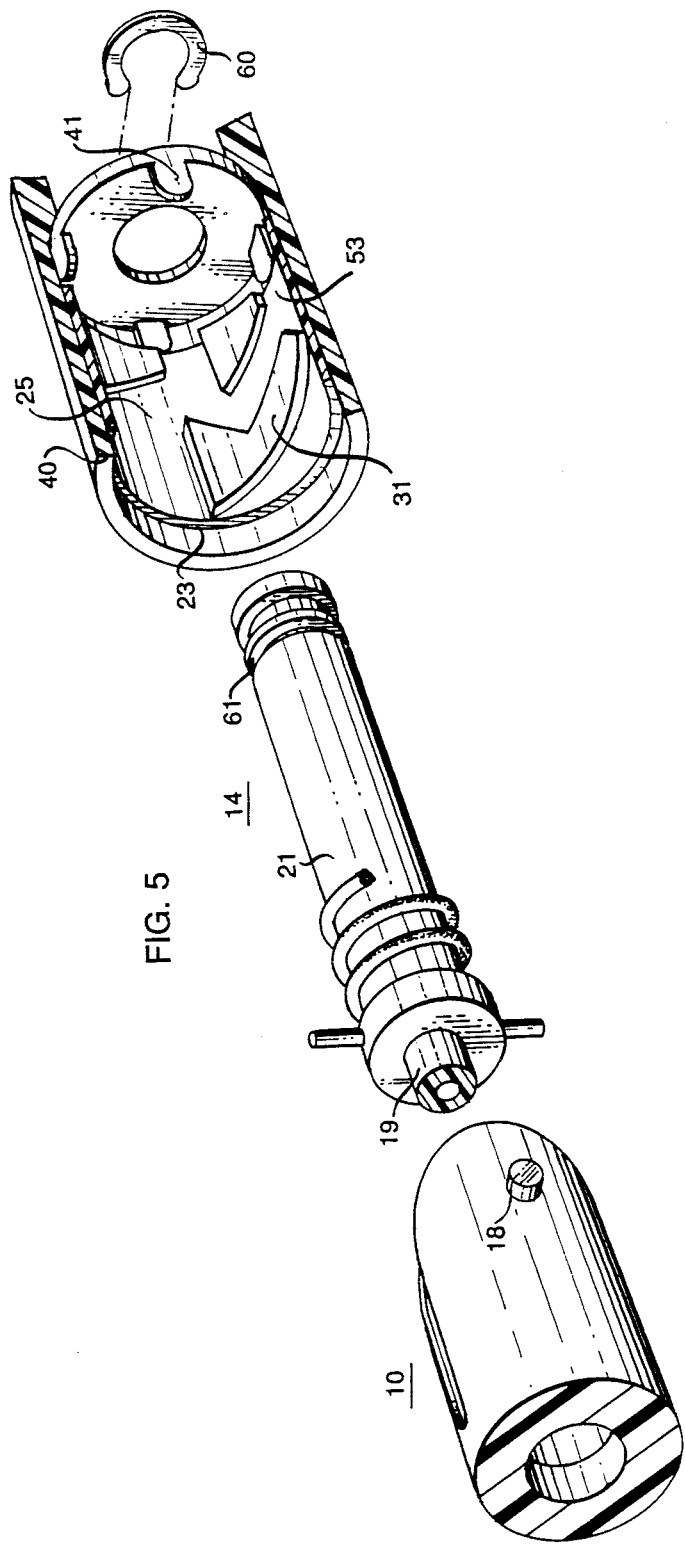

OPTICAL FIBER CONNECTOR INCLUDING SERPENTINE GROOVED MEMBER ACTUATED BY LONGITUDINAL FORCES

BACKGROUND OF THE INVENTION

This invention relates to optical fiber connectors.

Optical fiber connectors are necessary throughout lightwave systems wherever it is desired to optically couple two or more fibers together. Typical connectors employ a glass ferrule in which the fibers are situated. The ferrules are inserted within opposite ends of a sleeve so that the ferrules, and therefore the fibers, are aligned. In one form of connector, the ferrule is locked into the sleeve by means of rotating the ferrule a quarter turn until a tab on the sleeve is engaged by a collar mounted around the ferrule (See, for example U.S. Pat. No. 4,738,508 issued to Palmquist). Other types of connectors employ a latching mechanism to lock the ferrule into the sleeve (See, e.g., U.S. Pat. No. 4,327,964 issued to Haesly, and U.S. Pat. No. 4,611,887 issued to Glover). Latching mechanisms have also been proposed for male-female optical connector configurations (See, e.g., U.S. Pat. No. 4,225,214 issued to Hodge et al). Male-female connectors have also included means for rotating one of the plugs in order to engage locking tabs formed on the other plug (See U.S. Pat. No. 4,429,938 issued to Flor).

While adequate for most applications, most presently-available connectors cannot be easily adapted for use where a high density of fiber arrays is required. For example, in providing lightwave communications to each home, the fibers must be housed in underground closures where space is severely limited. This may require, for example, an array of 864 fibers in a panel measuring 38 cm high, 46 cm wide and 25 cm deep, which translates into a center-to-center spacing for the fibers of just 1.02 cm. In such dense arrays, it is difficult, if not impossible, for a technician to remove a fiber which requires either rotation or latch tripping by insertion of a hand around the connector in the space between adjacent connectors.

In order to deal with this problem, it has been proposed to provide a connector with a special locking collar including tabs engaging holes in the surface of the sleeve so that the fibers can be inserted and removed by a special tool (See U.S. patent application of R. L. Hinckley filed on an even date herewith).

It is, therefore, an object of the invention to provide an alternative design of optical fiber connectors which can be used conveniently in dense fiber arrays without the need for any tool for engagement or release of the optical connector.

SUMMARY OF THE INVENTION

This and other objects are achieved in accordance with the invention which is an optical fiber connector comprising a ferrule adapted for insertion of at least one optical fiber therein. The ferrule has a forward end and a rearward end. A sleeve is adapted to receive the ferrule therein at one end so that the forward end of the ferrule is aligned with another ferrule inserted at the opposite end of the sleeve. The surface of the sleeve includes at least one tab at each end. A grooved member is rotationally mounted around the ferrule. The member includes a serpentine groove with gaps such that a first longitudinal force on the ferrule causes a capture of the tab in the groove to secure the ferrule in the sleeve. A second longitudinal force on the ferrule causes a release of the tab from the groove to remove the ferrule from the sleeve.

BRIEF DESCRIPTION OF THE DRAWING

These and other features of the invention are delineated in detail in the following description. In the drawing:

FIG. 5 is an exploded perspective view, partly cut away, of an optical fiber connector in accordance with an alternative embodiment of the invention.

It will be appreciated that, for purposes of illustrations, these figures are not necessarily drawn to scale.

DETAILED DESCRIPTION

Figure 1:
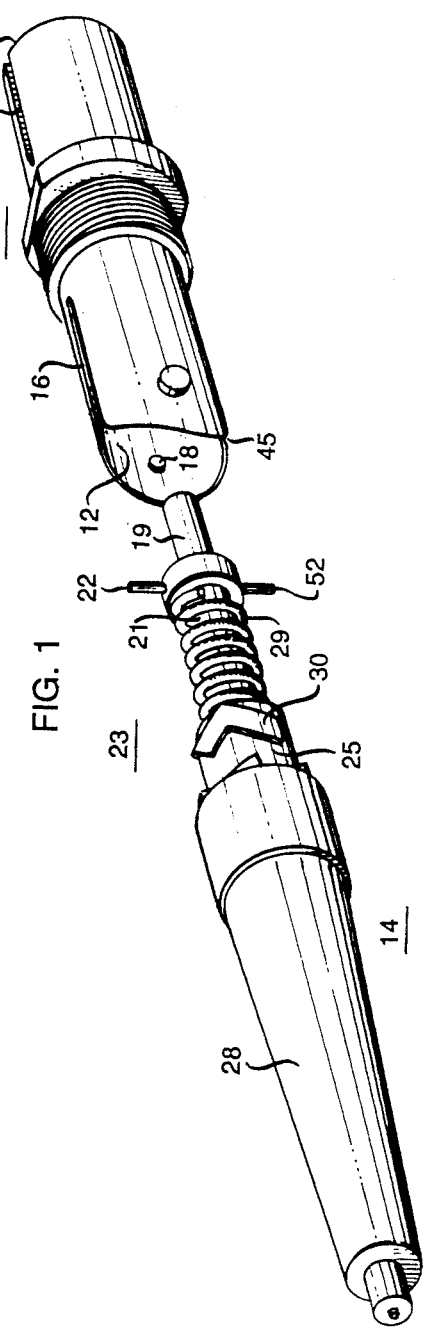
FIG. 1 is a perspective view of an optical connector according to one embodiment of the invention.
Figure 2:
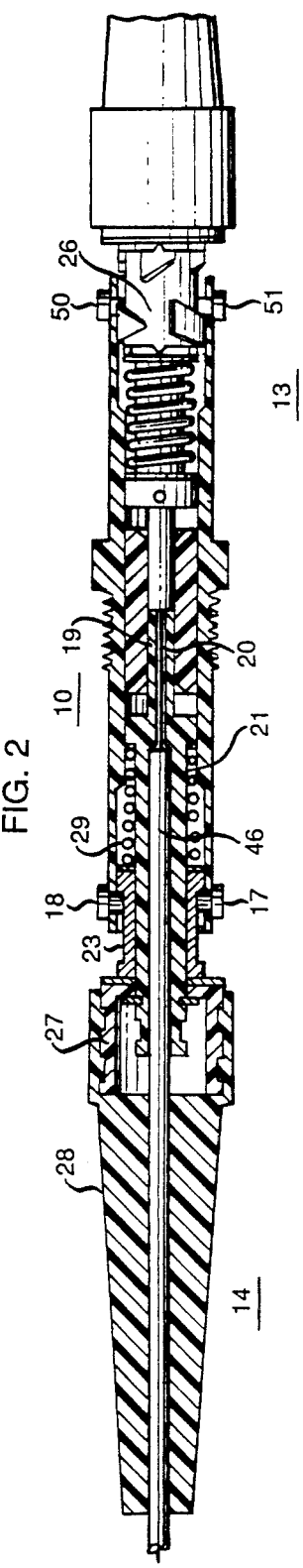
FIG. 2 is a side view, partly cross-sectioned, of the connector of FIG. 1.

The basic components of the optical connector in accordance with one embodiment are illustrated in the perspective view of FIG. 1 and cross-sectional side view of FIG. 2 where the connector is rotated approximately 90 degrees for illustrative purposes. The sleeve, 10, is essentially cylindrical with open ends 11 and 12 adapted to receive plugs 13 and 14 therein (plug 13 is omitted from FIG. 1 for purposes of clarity.) Also included at each end are alignment slots 15 and 16, as well as a pair of opposing locking tabs 17, 18 and 50, 51 extending on the inside surface of the sleeves. The inner, central portion of the sleeve is tapered to accommodate and align the two forward portions (ferrules) of the two plugs.

Since both plugs 13 and 14 are essentially the same, only plug 14 will be described in detail. At its forward portion, the plug includes a ferrule, 19, typically made of glass, with a bare portion of optical fiber 20 located therein. The ferrule is mounted within a barrel member, 21, typically made of nickel plated copper alloy, which is essentially cylindrical but includes a larger outer diameter section and a smaller outer diameter section. The larger diameter section includes an alignment tab 22 which is adapted to fit within slot 16 in the sleeve 10 when the plug is inserted therein. (Another alignment tab, 52, which is oriented opposite tab 22 fits within slot 45 shown in the Figure). The smaller diameter section includes a tapered cavity which houses a further portion of the optical fiber including its protective jacket 46 (See FIG. 2). A spring member 29 is inserted over the smaller diameter section. An essentially cylindrical locking collar, 23, is inserted over the rearward portion of the smaller diameter section of the barrel behind the spring member 29. The collar is mounted so that it is free to rotate as described in more detail below. The outer surface of the collar includes a plurality of protruding members, such as 30, which define a serpentine type groove configuration 25 around the circumference of the collar. The serpentine groove includes gaps, such as 26 of FIG. 3, which permit introduction of the tabs (e.g., 17) of the sleeve into the groove when the plug is inserted in the sleeve. The groove configuration also permits capture and removal of the tabs as explained in more detail below.

A strain relief member, 28, is provided for the jacketed fiber as it emerges from the rearward portion of the barrel member by fastening the member over the rearward end of the barrel. A stop member, 27, is also provided over the rearward portion of the barrel behind the locking collar 23. This member, typically made of nickel plated zinc, is also essentially cylindrical but includes circumferential grooves on its outside surface for the purpose of securing the rubber strain relief member 28.

The plug 14 is inserted with the tab 22 in alignment sleeve 16 until the forward portion of the barrel 21 makes contact with the tapered inner portion of the sleeve 10. At this point, the fiber 20 in the ferrule 19 is aligned with the fiber in the plug at the other sleeve opening (See FIG. 2).

Figure 3:
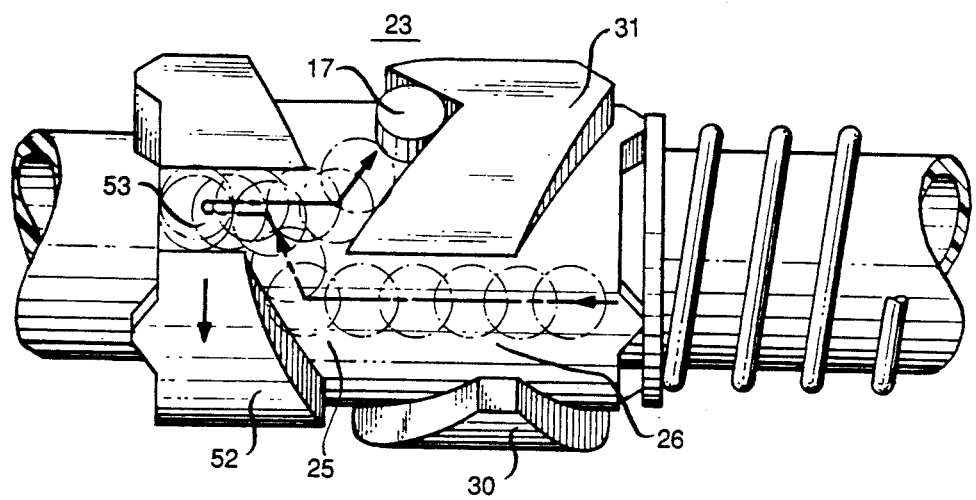
FIGS. 3 and 4 are side schematic views of a portion of the connector of FIG. 1 illustrating various stages of insertion and removal of a ferrule.
Figure 4:
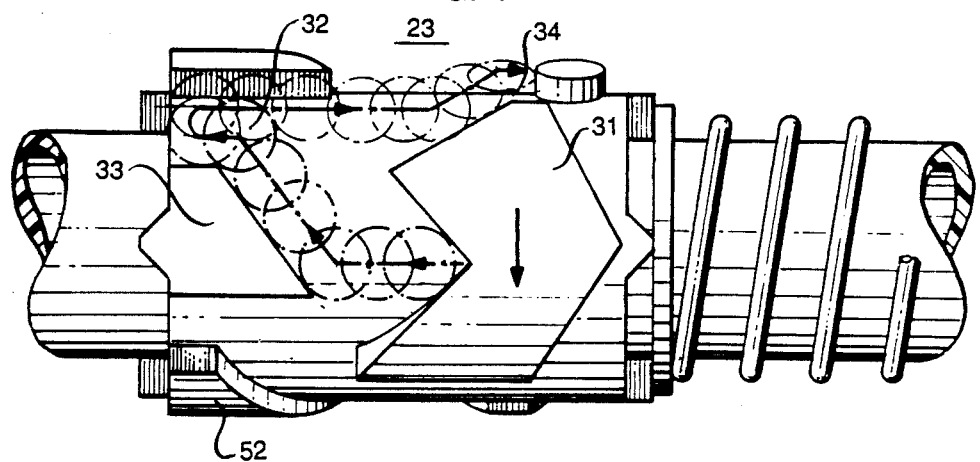

FIGS. 3 and 4 illustrate a portion of plug 14 during various stages of insertion and removal of the plug primarily in order to demonstrate the action of the locking collar 23. The circles in FIG. 3 represent the various positions of the tab 17 relative to collar 23 during insertion of the plug. As force is applied to the connector 14 to the right in FIG. 3, the tab 17 of the sleeve enters the groove via opening 26. In the event that the tab is not positioned to enter a gap, the tab will force a rotation of the collar in a direction into or out of the page as a result of contacting the sloped portion of one of the raised elements on the forward portion of the collar (e.g., 30 or 31). As additional longitudinal force is applied to element 27 of FIG. 1, the spring 29 compresses until the tab 17 makes contact with one of the raised portions (52) in the rearward portion of the collar as shown in FIG. 3. This causes a rotation of the collar in the direction indicated by the arrow drawn on portion 52 until the tab enters in the gap 53 in the collar, and is typically stopped from any further forward progress of the plug by element 27 (shown in FIG. 1). The force is then released. The compressed spring causes the collar to move out of the sleeve a short distance until the tab makes contract with the sloped portion of a raised element (31) at the forward portion of the collar. This causes a further rotation of the collar in the same direction until the tab is captured by element 31 as shown. The plug is now secured in the sleeve.

In order to remove the plug, a longitudinal force is again applied to element 27 in the direction of the forward portion of the plug. FIG. 4 also uses circles to illustrate the position of tab 17 relative to the collar, this time during various stages of removal of the plug. The force will move the collar so that tab 17 again contacts a raised element (33) to rotate the collar as indicated by the arrow on element 31 until the tab enters gap 32. The member 27 is then released and the spring force again causes movement of the collar out of the sleeve. This results in tab 17 contacting the sloped portion of a raised element (31) to further rotate the collar until the tab clears the collar through a gap (34) in the forward portion of the collar. As shown, this action releases the locking mechanism and the plug can be removed from the sleeve.

It will be appreciated, therefore, that the connector can be both inserted and removed by a longitudinal force applied at the rearward portion of the connector, either by hand or by use of an appropriate tool. There is no need to grasp the connector around the sleeve where little space is provided in a densely packed array. It will also be appreciated that since collar 23 is symmetrical, tab 18 on the opposite side of sleeve 10 will experience the same motion relative to the collar as tab 17. One of the important features of the connector is the fact that, while collar 23 is free to rotate, the ferrule, 19, is not free to rotate in order to prevent damage to the ends of the ferrules when making contact.

FIG. 5 illustrates another embodiment of the invention where elements similar to those of FIGS. 1-4 are similarly numbered. Only one end of the sleeve 10 is shown for purposes of illustration. In this embodiment, the tabs, one of which is shown as 18, are formed on the outer surface rather than the inner surface of the sleeve. The ferrule 19 is again mounted within a barrel member 21. In this embodiment, the collar 23 is rotationally mounted within an essentially cylindrical housing, 40, which is, in turn, mounted to the smaller diameter section of the barrel by means of clamp 60 engaging a groove 61 at the rear end of the barrel. The spring is mounted between the larger diameter section of the barrel and the rear wall of the housing. The collar 23 is free to move with respect to the barrel 21 and housing 40 when a longitudinal force is exerted thereon.

The collar, 23, again includes protruding members, e.g., 31, which define a serpentine groove 25 around the circumference of the collar, as well as gaps, e.g., 53. Here, however, the protruding members are formed on the inner rather than the outer surface of the collar. The housing, 40, also includes stop members, e.g., 41, in the area of the gaps, e.g., 53, at the rearward portion of the collar in order to stop the rearward motion of the tab 18 relative to the collar. The manner in which the plug 14 is inserted and removed from the sleeve 10 should be apparent from the previous discussion.

Various additional modifications will become apparent to those skilled in the art. For example, while the invention shows coupling two fibers together, it could also be used for coupling a fiber to a light emitting device or a photodetector where such a device is situated at one end of the sleeve 10. All such variations which basically rely on the teachings through which the invention has advanced the art are properly considered within the scope of the invention.

I claim:

1. An optical fiber connector comprising;
    a ferrule adapted for insertion of at least one optical fiber therein, said ferrule having a forward end and a rearward end;
    a sleeve adapted to receive said ferrule therein at one end, the surface of the sleeve including at least one tab at each end; and
    a grooved member rotationally mounted with respect to said ferrule, said member including a serpentine groove with gaps such that a first longitudinal force to the ferrule results in a capture of the tab in the groove to secure the ferrule in the sleeve and a second longitudinal force to the ferrule results in a release of the tab from the groove to permit removal of the ferrule from the sleeve.

2. The device according to claim 1 wherein the grooved member is essentially cylindrical and the groove is formed on the outer surface.

3. The device according to claim 1 wherein the grooved member is essentially cylindrical and the groove is formed on the inner surface.

4. The device according to claim 1 further comprising a stop member mounted adjacent to said grooved member for stopping the rearward motion of the tab with respect to the grooved member in the gaps.

5. The device according to claim 1 wherein the ferrule is mounted in an essentially cylindrical barrel member which includes a forward section including a relatively larger outer diameter portion and a rearward section including a relatively smaller outer diameter.

6. The device according to claim 5 wherein the grooved member is mounted around the smaller diameter section of the barrel.

7. The device according to claim 5 further comprising a spring mounted on the smaller diameter section of the barrel.

8. The device according to claim 3 further comprising an essentially cylindrical housing, where the grooved member is mounted within the housing.

9. The device according to claim 5 wherein the sleeve includes a slit at the said one end, and the larger diameter section of the barrel includes a tab which is adapted for insertion in said slit.

10. The device according to claim 1 wherein the sleeve includes an end opposite to said one end for receiving another ferrule therein which is aligned with said ferrule.

* * * * *